(12) United States Patent
Reichler

(10) Patent No.: US 7,891,589 B2
(45) Date of Patent: Feb. 22, 2011

(54) ELECTRICAL SEPARATING UNIT FOR A FLUID CONVEYING LINE

(75) Inventor: Jan Reichler, Constance (DE)

(73) Assignee: Eisenmann Anlagenbau GmbH & Co. KG, Boeblingen (DE)

( * ) Notice: Subject to any disclaimer, the term of this patent is extended or adjusted under 35 U.S.C. 154(b) by 1083 days.

(21) Appl. No.: 11/330,901

(22) Filed: Jan. 11, 2006

(65) Prior Publication Data

US 2006/0175825 A1    Aug. 10, 2006

(30) Foreign Application Priority Data

Jan. 13, 2005    (DE) ........................ 10 2005 001 765

(51) Int. Cl.
*B05B 3/00*        (2006.01)
(52) U.S. Cl. ............................. 239/692; 239/690; 251/4
(58) Field of Classification Search ............... 251/4, 251/5; 285/364, 370; 239/690, 692
See application file for complete search history.

(56) References Cited

U.S. PATENT DOCUMENTS

| | | | |
|---|---|---|---|
| 2,518,625 A * | 8/1950 | Langstaff | 137/494 |
| 2,712,831 A * | 7/1955 | Day | 138/26 |
| 2,995,335 A * | 8/1961 | Raftis | 251/5 |
| 3,441,245 A * | 4/1969 | Barnsley et al. | 251/5 |
| 3,589,602 A * | 6/1971 | Cushman | 236/98 |
| 4,498,631 A * | 2/1985 | Gourdine | 239/692 |
| 5,083,711 A * | 1/1992 | Giroux et al. | 239/690 |
| 5,118,071 A * | 6/1992 | Huelle | 251/11 |
| 5,131,423 A * | 7/1992 | Shaw | 137/1 |
| 5,316,261 A * | 5/1994 | Stoner | 251/5 |
| 6,117,242 A * | 9/2000 | Kreiselmaier | 118/712 |
| 6,849,129 B2 * | 2/2005 | Bilz et al. | 118/629 |
| 2005/0067590 A1* | 3/2005 | Bush | 251/4 |
| 2005/0092944 A1* | 5/2005 | Patterson | 251/4 |

FOREIGN PATENT DOCUMENTS

| DE | 295 06 422 U1 | 10/1995 |
|---|---|---|
| DE | 102 33 006 A1 | 2/2004 |

* cited by examiner

*Primary Examiner*—John K Fristoe, Jr.
(74) *Attorney, Agent, or Firm*—Factor & Lake, Ltd.

(57) ABSTRACT

An electrical separating unit is disclosed for a fluid conveying line, in particular a paint conveying line, which has an elongated separating pipe that can be freed or closed at its ends by separating valves. The interior of the separating pipe can be brought by a compressor to a pressure that is significantly above atmospheric pressure or can be evacuated by a suction pump to a pressure that is significantly below atmospheric pressure. In both cases the electrical resistance of the separating unit has a significantly higher value than if a pipeline over a corresponding length was only freed from paint, solvent, or cleaning agent, and was filled with air.

27 Claims, 9 Drawing Sheets

ELECTRICAL SEPARATING UNIT FOR A FLUID CONVEYING LINE

RELATED APPLICATIONS

The present invention claims the benefit of the filing date of German Patent Application, Serial No. 10 2005 001 765.7, filed Jan. 13, 2005

FIELD OF THE INVENTION

The present invention relates to an electrical separating unit for a fluid conveying line.

BACKGROUND OF THE INVENTION

The problem of electrically insulating a spray gun, under high voltage, of an electrostatic paint shop from the remaining paint shop parts has already been discussed in DE 102 33 006 A1. It is proposed there in connection with a scrapeable paint supply system to in each case move scrapers ("go-devils") by means of blowing air so that a line section of predetermined length of the conveying lines made of electrically insulating plastics material is in each case filled with air and is thus paint-free.

In order to ensure that the in each case desired electrical insulation between the high voltage part and the part of the unit at earth potential is guaranteed, the position of various scrapers must be monitored by using detectors, in which a distinction always has to be made between scrapers that form the boundary of the front end of a paint packet and scrapers that form the boundary of the rear end of a paint packet. Similar problems arise when conveying electrically conducting solvents in lines of electrostatic paint shops and also in conjunction with other consumers to be connected to a high voltage, for example electrostatic spray cones or similar electrostatic spraying devices.

There is also the problem of the mutual electrical separation of sections of a conveying line not only in the case of liquid media but also with gaseous and flowable pulverulent media. In the following description and in the claims these media are jointly understood to be fluids.

In this known procedure the line section freed from liquid is filled with air under a slight excess pressure that is just sufficient to move the scrapers.

SUMMARY OF THE INVENTION

It has now been found that atmospheric air still has a significant electrical conductivity, which in particular also depends on the atmospheric humidity. In order to ensure the desired electrical isolation in the case of high voltages, the liquid-free air-filled line section must be relatively long.

The present invention therefore aims to develop an electrical separating unit wherein a good electrical isolation is ensured even with a relatively short stretch in the flow direction of the medium.

This object is achieved according to the present invention by an electrical separating unit having the features described herein.

In the separating unit according to the invention the line section free of liquid is formed as a separating pipe (fluid conveying element), which is made of insulating material and can be rigid or flexible. The interior of the separating pipe may either be brought to a pressure that is significantly greater than atmospheric pressure or may be evacuated to a pressure that is significantly less than atmospheric pressure. In this way it is ensured that the electrical resistance of the gas column remaining in the separating unit after the displacement of the liquid is increased, since the specific resistance (resistivity) of air increases both at lower pressures as well as at higher pressures starting from a minimum pressure, which is somewhat less than 100 Pa. For example, the breakdown strength of air at $10^{-2}$ Pa as well as at $10^6$ Pa is about 100 times greater than at 100 Pa.

Such operating states of the separating unit with a high breakdown strength which, as already mentioned, are realised by charging with gas at a pressure that is significantly above atmospheric pressure or by reducing the pressure to a pressure that is significantly below atmospheric pressure, are identified in the present description and in the claims as isolating position or isolating state, or separating position or separating state.

In contrast to this a de-aerated state exists when no liquid is present in the separating pipe but the interior of the separating pipe is filled with gas that is substantially under atmospheric pressure.

In a conveying or operating state the separating unit is filled with fluid to be conveyed.

In the present description the term operating state or conveying state is also understood to be a state of the separating unit in which the separating pipe is filled with the fluid to be conveyed.

The invention enables the dimension of the separating unit in the conveying direction of the line to be significantly reduced for a predetermined requirement regarding the breakdown strength of the separating unit. This is extremely advantageous for many applications, in particular in cases where a movable consumer to be subjected to a high voltage is connected via a plurality of lines to supply lines fixed to the structure, so that a plurality of separating units for the various supply lines are required for the movable consumer.

The separating unit according to the invention should be able to be realised relatively simply as regards its mechanical part.

Normally the separating pipe is subjected to pressure by using compressed air, since this separating fluid can be provided relatively inexpensively and (after use and after removing organic constituents, e.g. by combustion), can simply be discharged.

In cases where a particularly high electrical breakdown strength is required, another separating gas such as $SF_6$ that has a particularly high breakdown strength may also be used instead of compressed air.

Finally, the separating unit according to the invention may also be used in conjunction with separating liquids that have a high electrical breakdown strength. Suitable separating liquids include for example transformer oils. Preferred however are gases, since when the separating unit is reopened, these do not leave behind any residues that could adversely affect the quality of the conveyed fluid (e.g. paint).

Other advantageous aspects of the present invention are further disclosed herein.

In one aspect of the present invention, a pressure seal with respect to the ambient atmosphere is produced by pressure-sealing line sections of the conveying line, into which the separating unit is inserted. Line sections that are themselves pressure-sealing are for example sections that contain gear pumps or sections that contain a control valve for regulating the fluid release. Any losses of separating fluid due to leakage can be compensated by replenishing with separating fluid, so that the size of the fluid-free isolating stretch remains unchanged.

In another aspect of the present invention, a separating unit is provided with a separating valve that may be closed off at a line section that does not itself act as a pressure seal against the surroundings.

In another aspect of the present invention, a separating unit may, at both its ends, be closed off at a line section that does not itself act as a pressure seal against the surroundings.

In another aspect of the present invention, a separating unit may be restored to a residue-free state for the conveyance of the fluid.

In another aspect of the present invention, a separating fluid can be obtained inexpensively in a high state of purity by conventional industrial processes and can easily be disposed of.

In another aspect of the present invention, a fluid channel is formed in a housing, which channel can as desired be made available for the conveyance of the fluid or can be closed off by a displacement body. The dimensions and thus the quality of the electrical isolating section can be reliably predetermined by the dimensions of the displacement body. The mechanically simple construction of the separating valve ensures that the displacement body is in each case in the correct position.

An object of the present invention is to provide an adjustment of the displacement body between the conveying position and the separating position without sliding-type relative movement. The separating valve is accordingly characterised by the fact that it operates reliably and in a substantially friction-free manner also in the presence of manufacturing tolerances and impurities.

In another aspect of the present invention, the fluid channel of the housing can be completely sealed via a rotationally symmetrical design of the displacement body. The fluid channel also has a shape that is favourable to flow and can be cleaned particularly easily. The same also applies to the displacement body.

Another object of the present invention is to provide a secure and tight installation of the displacement body in the housing.

Another object of the present invention is to ensure that the displacement body that can be subjected to pressure includes a precise wall area of the fluid channel also in the pressure-free state. This is then particularly advantageous if the separating valve is part of a scrapeable conveyor system, since the scrapers then also clean the interior surface of the displacement body.

Another object of the present invention is to provide smooth continuous through-flow channel of the separating valve, which is advantageous as regards scrapeability and cleaning.

Another object of the present invention is to facilitate the greatest possible freedom from impact in the connection regions of the separating valve.

Another object of the present invention is to ensure that the displacement body lies flat in a predetermined manner when subjected to pressure.

Another object of the present invention is to ensure that the displacement body displaces the fluid contained in the fluid channel successively to one of the connection openings of the housing. In this way fluid inclusions may be avoided between the layers of the pressed together, flat displacement body.

Another object of the present invention is to a simple and reliable separating position that can be achieved without any sliding movement of parts, and wherein wall sections of the displacement body are displaced with only a slight elastic expansion between the sealing position and conveying position.

Another object of the present invention is to provide a defined fluid-free stretch in the conveying connection in the interior of the housing of the separating valve using mechanical means that are simple to actuate and easy to monitor.

Another object of the present invention is to provide favourable flow conditions.

Another object of the present invention is to provide that the transition between the conveying position and sealing position, i.e. between the two operating positions of the separating valve, can be effected without fluid having to be released for this purpose into the line containing the separating valve. The displacement of the amount of fluid contained in the separating valve occurs in a direction transverse to the conveying direction, with the result that the fluid volume contained in the line remains unchanged.

Another object of the present invention is to provide a mechanism for easily checking whether the actual isolation that the separating unit actually provides meets the desired requirements.

Another object of the present invention is to ensure that the application of a high voltage to a consumer connected to the conveying line can only take place if the separating unit effects the necessary electrical isolation.

A further aspect of the present invention enables a fluid consumer connected to the conveying line to be supplied with fluid also during those times when the separating unit has to adopt its separating position so that the load, for example an electrostatic spray gun, can be connected to a high voltage source.

Another aspect of the present invention provides a separating unit that may be part of a scrapeable line system since the separating unit (in the terminal separating valves and in the separating pipe) has the same diameter throughout, which is chosen to be equal to the internal diameter of the scrapeable conveying line.

Another object of the present invention is to provide a separating pipe including good electrical insulating properties and good mechanical properties (low friction for scrapers, good abrasion resistance also under abrasive conditions).

Another aspect of the present invention provides for the monitoring of the pressure build-up and the evacuation of the separating pipe.

Another aspect of the present invention provides for pressure build-up and the evacuation of the separating pipe to be terminated when the separating unit has reached the desired high electrical resistance.

Another aspect of the present invention ensures that the pressure in the interior of the separating unit is not increased above a maximum permitted value or is not reduced to an unallowably low level if a short circuit path exists in the separating unit as a result of interference conditions.

BRIEF DESCRIPTION OF THE DRAWINGS

The invention is now described hereinafter with the aid of examples of implementation and with reference to the accompanying drawings, in which.

DETAILED DESCRIPTION OF THE PRESENT INVENTION

Figure 1:
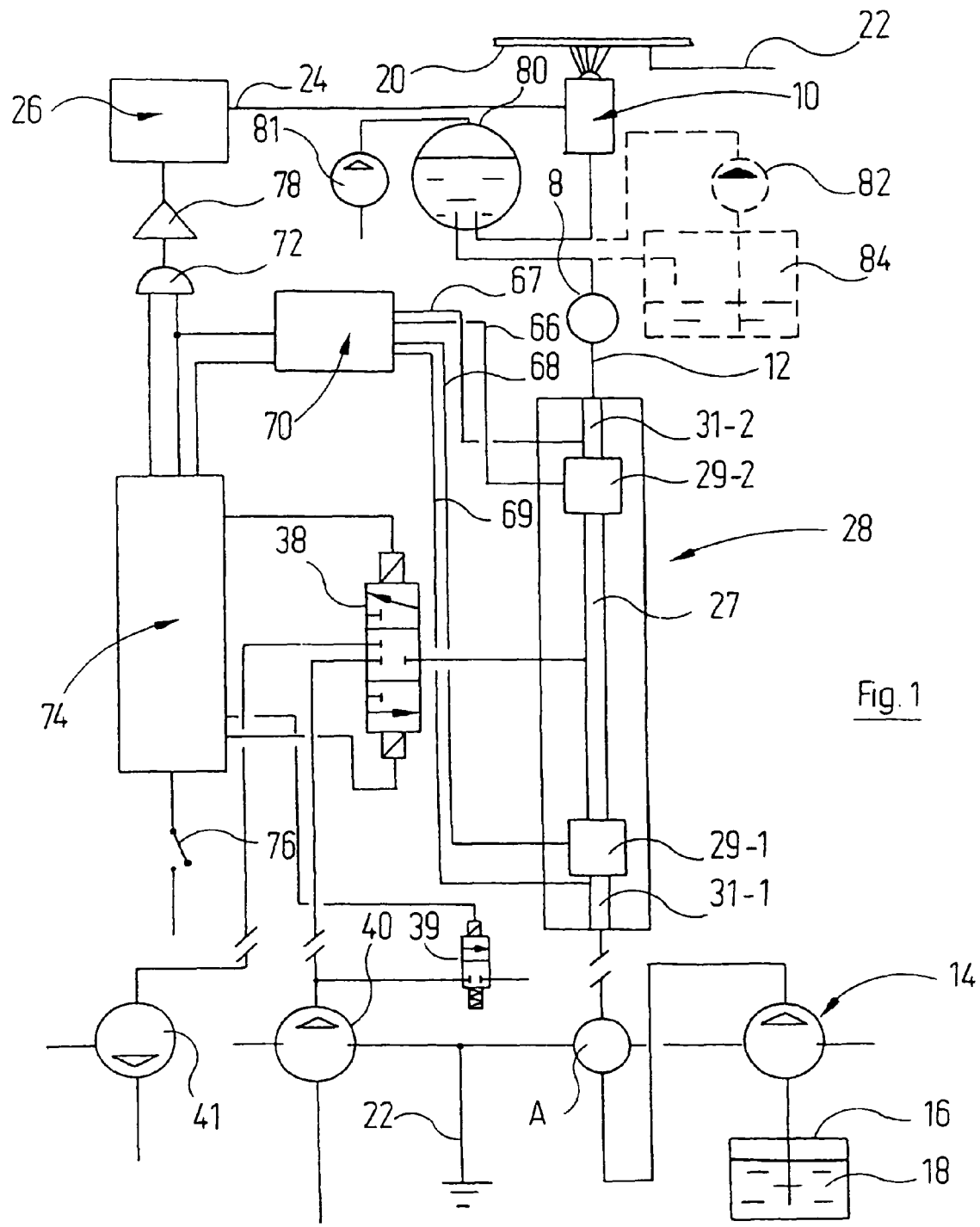
FIG. 1 is a diagrammatic representation of a workplace for electrostatic spray painting with a voltage separating unit, which is shown only diagrammatically, arranged in a paint conveying line.

In FIG. 1 a spray gun is identified by the reference numeral 10, and is connected via a line 12 to the outlet of a paint pump 14. The pump draws in paint from a storage vessel 16 that contains a volume of paint 18 of predetermined colour.

In order to improve the uniform application of paint to the workpiece the electrostatic spraying method is employed. For this purpose a workpiece, illustrated diagrammatically by 20, is connected to earth via a line 22, while the spray gun 10 is connected via a line 24 to the output of a high voltage generator 26.

Paints, in particular metallic paints, used to spray vehicles have an electrical conductivity that drops dramatically when the paints are exposed to a high electrical field strength. This applies even more to water-based paints.

In order to insulate electrically the spray gun 10 from paint plant parts that are at earth potential, a separating unit 28 is inserted into the line 12. This unit ensures that, under operating conditions, the potential of the high voltage generator 26 is blocked with respect to earth and of course also as regards the conveyed paint (or other conveyed electrically conducting liquids or flowable powders).

The separating unit 28 includes a separating pipe 27 that carries separating valves 29-1 and 29-2 at its two ends.

The separating unit 28 is connected via electrically conducting tubular connection pieces 31-1, 31-2 to the conveying line 12.

In the example of implementation considered here the interior of the separating pipe 27 can, if desired, be tightly closed off via a 3/3 magnetic valve 38 or can be connected to the conveying side of a compressor 40 supplying compressed air or to the suction side of a suction device 41.

For paint supply systems in which it is sufficient if the isolating state can be obtained either by increasing the pressure or by lowering the pressure of the separating gas air, a 3/2 magnetic valve may be provided instead of the 3/3 magnetic valve 38 and either the compressor 40 or the suction device 41 can be omitted.

The construction of the separating valves 29-1 and 29-2 is described in more detail hereinafter. Where a difference between these valves is not important, simply a separating valve 29 is described.

A separating valve 29 has in each case a housing 30 in which a cylindrical chamber 34 is formed.

In the interior of the chamber 34 is arranged, radially inwardly displaced from its wall surface, a perforated supporting body 42 that is supported axially at the end walls of the chamber 34.

The supporting body 42 serves to support, in a conveying position of the separating valve 29, a deformable displacement sleeve 44 in a radial outwards direction. This flexible tube is formed from an electrically highly insulating elastomeric material and has a cylindrical basic geometry in the unloaded state. Radial mounting flanges 46 are formed at the ends of the displacement sleeve 44. These flanges are accommodated in corresponding annular depressions 48 that surround an inlet opening 50 and an outlet opening 52 of the housing 30 and are provided in the front faces of the housing 30. Two annular clamping plates 54 are secured by means of bolts 56 (shown only diagrammatically) on the front faces of the housing 30. These have central openings 58 that form a smooth continuation of the inlet opening 50 and of the outlet opening 52.

The axial dimension of the depressions 48 is, as is conventional in seals, dimensioned so that it is slightly less than the axial dimension of the mounting flange 46, with the result that the latter is compressed somewhat when the clamping plates 54 are bolted on.

The separating valve 28 thus has end flanges that are formed by the flange 32 and clamping plates 54 bolted together. These end flanges are in turn connected to flanges that are provided at the ends of the connection pieces 31-1, 31-2 facing towards the separating unit 28 and are tightly connected thereto.

Figure 2:
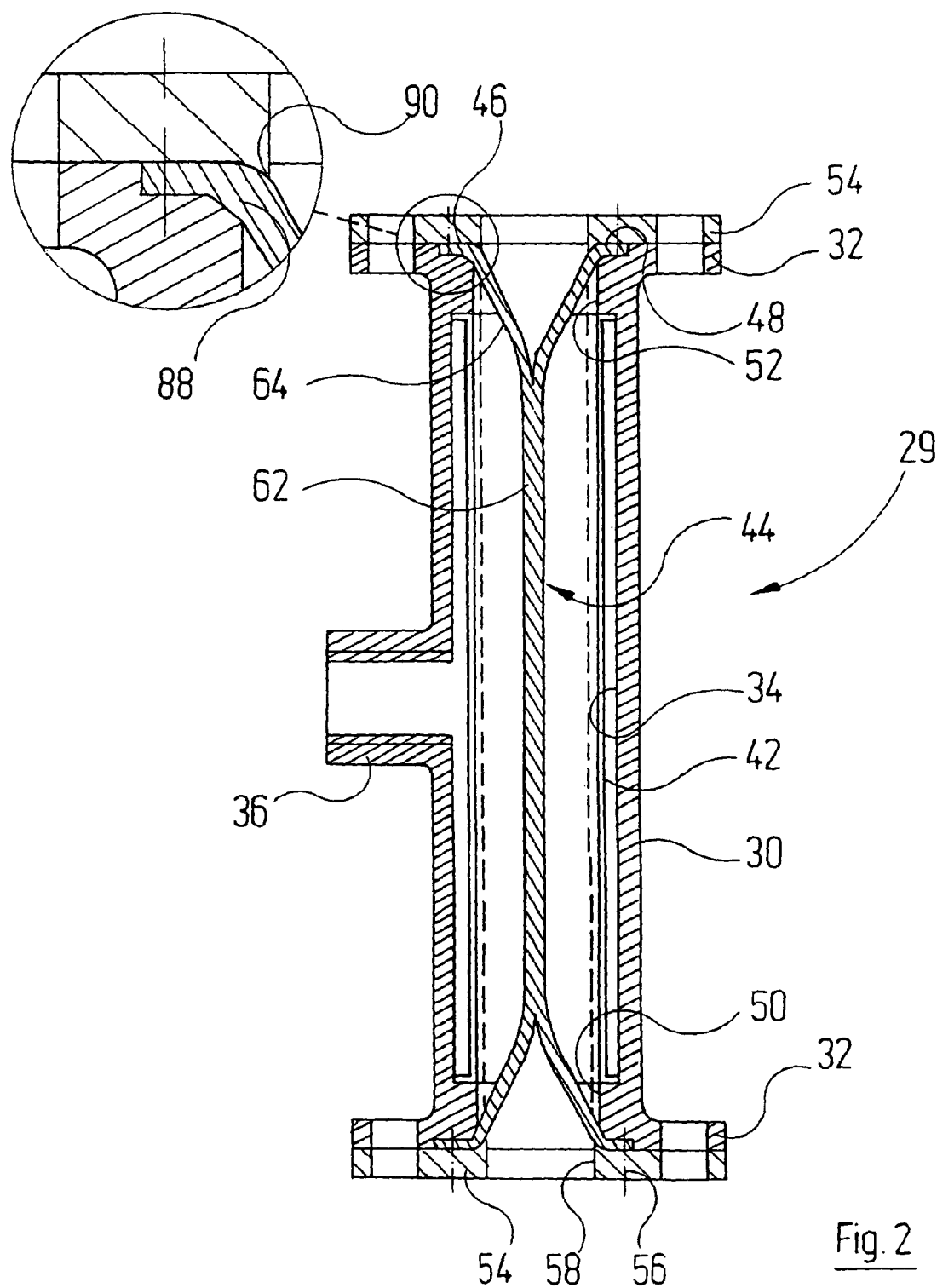
FIG. 2 is an axial section on an enlarged scale through a separating valve of the separating unit according to FIG. 1.

If the connection piece 36 is subjected to pressure, then the displacement sleeve 44 moves from the conveying position shown by dotted lines in FIGS. 1 and 2 into a sealing position represented by full lines. In this sealing position the originally sleeve-shaped displacement sleeve is compressed into two layers lying above one another, similar to the situation in pinch valves. This squeezing effect occurs however over the largest part of the axial dimension of the displacement sleeve 44. This thus has in the sealing position a middle flexible tube section 62 that consists of two layers lying two-dimensionally above one another that are pressed flat together, as well as a transition section 64 that in the axial outward direction forms a uniform transition from the compressed, flat geometry to a round geometry, which in the fixing positions of the displacement sleeve 44 is forcibly achieved by clamping the mounting flange 46.

In the folding of the displacement sleeve 44 into a flat geometry that is achieved by exerting pressure on the connection piece 36, the corresponding volume of paint contained in the separating valve 29 is forced out in the axial direction.

An isolating section free of paint is thus present in the interior of the separating valve 29, which can contribute to the fact that, when a high voltage is applied to the spray gun 10, no current flows to that part of the line 12 connected to the metering pump 14.

In order to ensure that electrically conducting paint is actually interrupted over a sufficient stretch after the chamber 34 has been subjected to pressure, the electrical resistance of the separating valve 29 can be measured in the simple manner described hereinafter:

whereas the housing 30 and the displacement sleeve 44 are fabricated from electrically highly insulating materials, the clamping plates 54 are made of electrically conducting material. They thus form at the same time electrodes that can be used to measure the resistance of the separating valve 29.

For this purpose the clamping plates 54 are connected by cables 66, 68, which apart from electrical leads also contain flexible tubes for exerting pressure on or releasing pressure from the displacement sleeve 44, to two inputs of a control device 70, which inter alia includes a resistance discriminator (combination of resistance measuring instrument and threshold switch). This discriminator can operate in a conventional way, for example can measure the current that flows in each case between the two clamping plates 54 when the voltage is applied (resistance measurement). If this current lies below a predetermined threshold value, i.e. if the resistance of the separating valve 29 lies above a predetermined resistance value, then the resistance discriminator of the control device 70 generates at its output a display signal indicating that the separating valve 29 is in the isolating state (threshold switch). The control device 70 for the second separating valve contains a further discriminator circuit, which operates in a similar way to that described above.

A third resistance discriminator circuit of the control device is connected via lines 67, 69 to the connection pieces 31-1, 31-22.

The control device 70 establishes from the resistance values obtained as described above whether the two separating valves 29-1 and 29-2 are correctly closed and are emptied of paint. Also, the control device establishes from the overall resistance of the separating unit 28 measured via the connection pieces 31-1 and 31-2 whether this unit is overall sufficiently well insulated so that a high voltage can be applied to the spray gun 10. If this is the case, the control device 70 generates a release signal.

This is normally the case if paint or another conducting liquid is still present in the separating unit 28, though on the other hand no release signal is made available since the resistance of the separating unit 28 is too high.

In order to remove the liquid from the separating unit 28 for the preparation of the isolating state, a scraper is first of all infiltrated upstream of the separating unit 28 via a scraper station A and sent to a scraper station B lying behind the separating unit 28. This is effected by using compressed air, which is fed to the scraper station A through a 2/2 magnetic valve 39.

With liquids of very low viscosity the separating unit 28 may alternatively be provided at its lowest point with a discharge opening that is closed by a normally closed magnetic valve. By opening this magnetic valve the liquid contained in the separating unit 28 can then run out under the force of gravity.

When during the scraper cleaning procedure the scraper (not shown in the drawing) has left the separating unit 28, which can be detected by a rise in the resistance of the separating valve 29-2, the control device 70 switches the separating valves 29 to the closed position. After the separating valves 29 have reached the closed position (time-controlled or detected by a further change in the electrical resistance), the control device 70 issues a pressure change control order to a master control 74.

This now causes the magnetic valve 38 to move from its neutral closed position to a first operating position or a second operating position. In the first operating position the separating pipe 27 is connected to the suction side of the suction device 41, and in the second operating position is connected to the conveying side of the compressor 40. The specific resistance of the gas filling of the separating pipe 27 increases both when the pressure rises as well as when it falls, with the result that the overall resistance of the separating unit 28 rises, the actual value of which is measured via the current flowing through the connection pieces 31-1, 31-2, as outlined above. When the resistance is sufficiently high the control device 70 generates the release signal discussed above.

This release signal is combined in an AND unit 72 with a control signal that is made available by the control 74 for the spray gun 10, and also passes to the control 74, which thereupon returns the magnetic valve 38 to the closed position.

As for the rest the control operates, in simple terms, depending on a switch 76, which is closed in each case when the spray gun 10 is to operate, which has to be subjected to a high voltage.

If the switch 76 is closed, then the control 74 controls the aforedescribed movement of a scraper from the scraper station A to the scraper station B, whereby liquid contained in the separating unit is displaced. At the same time the control issues a control signal to the AND unit 72. However, to start with still no signal is received at the output of the AND unit since its second input contains a low-level signal.

This is why to start with air is still present in the interior of the separating unit 28, the air being sufficiently electrically conducting that it would cause a short circuit of the spray gun 10 to earth via the metering pump 14. Only when the pressure in the interior of the separating pipe 27 has risen or fallen to such an extent that the electrical conductivity was greatly reduced is this electrical current path interrupted (isolating state). The control device 70 detects this and now makes available at its output the release signal as the other input signal for the AND unit 72. Its output signal is passed through an amplifier 78 to a control terminal of the high voltage generator 26. The spray gun 10 is thus placed under a high potential.

During operation with the spray gun paint is then withdrawn from a storage vessel 80 that is connected to the line 12 and is filled with paint when the separating unit 28 is not in the sealing mode, and from which paint can be withdrawn and re-metered by exerting pressure on the head space of the storage vessel when the separating unit 28 is in the sealing mode. A compressor 81 (or another source of compressed gas) can be used for this purpose, the outlet of which is connected to the uppermost point of the storage vessel 80.

Alternatively a forcing pump 82 could be provided, which sucks out from a storage vessel 84 into which the paint pump 14 then conveys paint when the separating unit 28 is in the conveying position. This variant is illustrated by dotted lines in FIG. 1.

The clamping of the ends of the displacement sleeve 44 in the housing 30 is carried out so that the displacement sleeve 44 in its initial geometry, which is obtained when the pressure of the chamber 34 is released, forms a smooth continuation of the inner surfaces of the openings 58 of the clamping plates 54.

To this end the inlet opening 50 and the outlet opening 52 have a radius that is greater by exactly the wall thickness of the unstressed displacement sleeve 44 than the radius of the openings 58 of the clamping plates 54. The inner surface of the supporting body 42 forms a smooth continuation of the inlet opening 50 and outlet opening 52.

As is clear in more detail from FIG. 2, the axially outer and radially inner lying edges of the inlet opening 50 and of the outlet opening 52 are rounded off, as shown at 88.

The clamping plates 54 have wedge-shaped ribs 90 on their axially inner lying internal edge, which ribs have on their side pointing axially inwardly a contour that runs, at an interspacing equal to the wall thickness of the displacement sleeve 44, parallel to the rounded-off part 88. In this way a practically impact-free continuous inner surface of the separating valve 29 is obtained when the displacement sleeve 44 is not subjected to pressure. This enables a separating valve such as has been described above also to be used in scrapeable systems.

Figure 3:
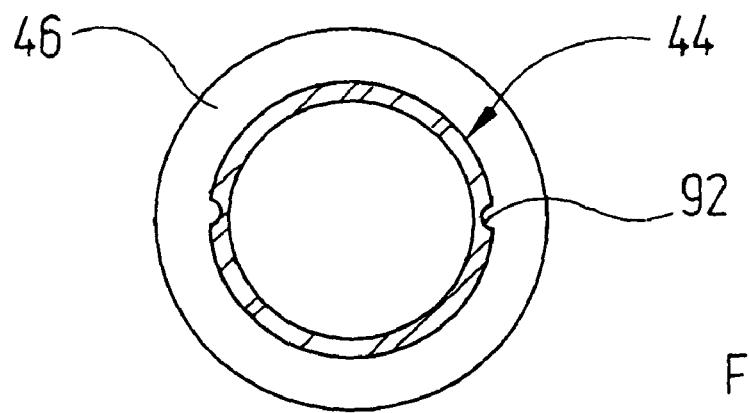
FIG. 3 is a transverse section through a modified displacement sleeve for a separating valve according to FIG. 2.

In the modified displacement sleeve 44 shown in FIG. 3, two axially parallel grooves 92 lying diametrically opposite one another are formed in the outer surfaces. Two axially parallel regions of weakness that define the edges of the displacement sleeve 44 that folds up when subjected to pressure are thus obtained. On account of the grooves 92 a defined folding of the displacement sleeve 44 in a predetermined plane is thereby obtained.

Figure 4:
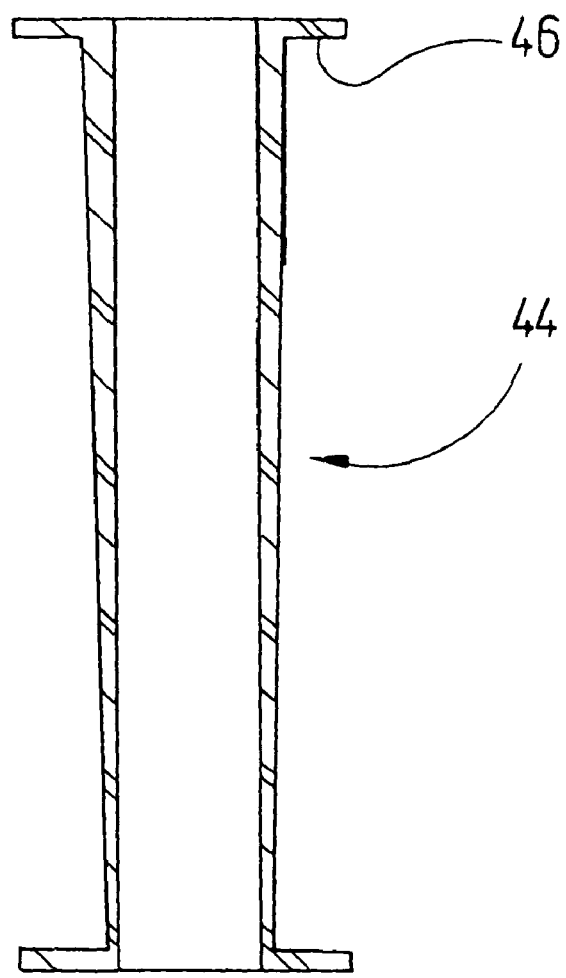
FIG. 4 is an axial section through a displacement sleeve, again modified, for a separating valve according to FIG. 2.

In the further modified displacement sleeve 44, shown in FIG. 4, the wall thickness of the sleeve-shaped flexible tube section in the drawing increases from the bottom to the top. This means that, in use according to FIG. 1, the wall thickness increases from the inlet to the outlet of the separating valve 29-2.

In this way it is ensured that the displacement sleeve 44 is progressively squeezed as the pressure in the chamber 34 increases from the inlet to the outlet of the separating valve 29-2. This progressive squeezing of the displacement sleeve 44 ensures that the amount of paint present in the interior of the displacement sleeve is inevitably forced out from interior of the displacement sleeve 44 in the direction defined by the thickness profile of the wall of the sleeve, and no paint inclusions can form in the said displacement sleeve.

In the case of the separating valve 29-1 the displacement sleeve 44 is installed in precisely the opposite way, so that remaining fluid squeezed out from the interior of the chamber 34 is similarly forced out from the separating valve 29, but in the direction towards the inlet of the separating unit 28.

Figure 5:
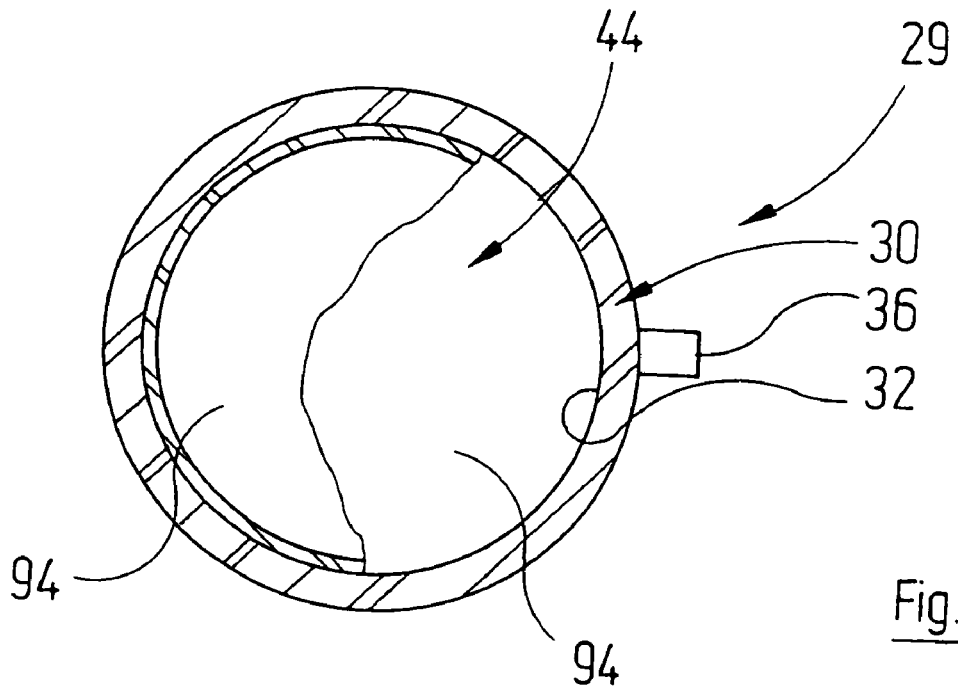
FIG. 5 is a transverse section through a separating valve, again modified, illustrated in the closed position.
Figure 6:
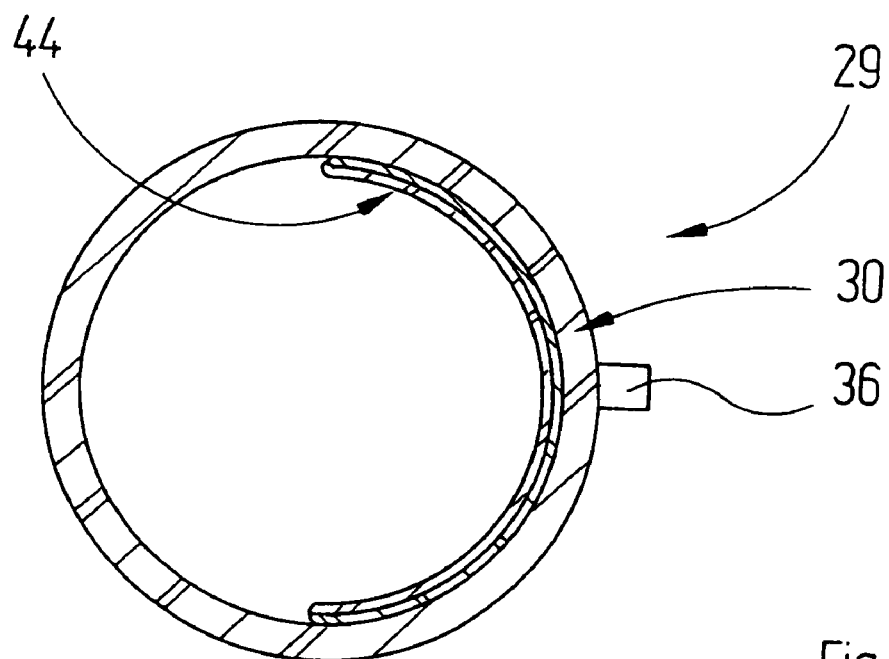
FIG. 6 is a section similar to FIG. 5, in which however the separating valve is shown in a conveying position.

In the modified example of implementation according to FIGS. 5 and 6 parts of the separating valve 29 that have already been described above in a functionally equivalent form with reference to FIG. 2 are again provided with the same reference numerals.

The displacement sleeve 44 is now firmly closed at its ends by front walls 94. The interior of the displacement sleeve 44 can again be charged in a controllable manner with compressed air. The displacement sleeve 44 now has no mounting flange 46 however, but instead is securely connected, for example bonded, by a part of its circumferential surface that is adjacent to the connection piece 36, to the wall of the chamber 34.

In a conveying position of the separating valve 29, which is obtained on releasing the pressure of the connection piece 36 due to the fact that the pressure of the accumulated paint causes the displacement sleeve 44 to fold up, the two circumferential halves of the displacement sleeve 44 lie on top of one another, as shown in FIG. 6. If desired, the change in position of the displacement sleeve 44 from the sealing position to the conveying position can be accomplished or assisted by subjecting the connection piece 36 to reduced pressure.

With the separating valve according to FIGS. 5 and 6, by way of modification the chamber 34 can be formed having two different halves: one half of the chamber has a radial dimension that is larger, by twice the wall thickness of the displacement sleeve 44, than the radius of the other half of the chamber. In this way, in the conveying position of the separating valve 29 a substantially continuous cylindrical inner surface of the separating valve is again obtained, with the result that this too is also highly suitable for scrapeable systems.

On the other hand, when subjecting the connection piece 36 to pressure the displacement sleeve 44 closed at its end is inflated and thereby seals the passage through the chamber 34.

In order to displace the medium (paint or cleaning fluid in the example of implementation considered here) present at the beginning of the closure process in the separating valve 29 specifically in one direction from the chamber 34, the displacement sleeve 44 can in a further modification of the invention be designed somewhat tapering, so that the section of the displacement sleeve of larger diameter already comes to rest against the chamber wall at lower pressures before the sections of the displacement sleeve 44 of smaller diameter.

In the example of implementation illustrated in FIGS. 5 and 6 the displacement sleeve 44 needs to be deformed only slightly elastically. The sleeve is basically folded on itself.

In the examples of implementation described above the deformation of the displacement sleeve 44 was carried out by subjecting the sleeve to compressed air. By way of modification, the sleeve can also be subjected to pressure by using a sufficiently insulating liquid, in particular an insulating oil such as transformer oil. The separating valve 29 shown in FIG. 7 has in turn a housing 30 made of an electrically highly insulating material, which is held by two end plates 54 that are made of metal and that also serve to form the connections to the connection pieces 31-1, 31-2.

In the interior of the housing 30 a channel 96 is formed, in which a displacement rod 98 made of an electrically highly insulating material can be tightly displaced. A drive 100, which may be formed by a linear motor such as a double-acting cylinder, serves to move the displacement rod 98 between a locking position shown by dotted lines in the drawing, and a conveying position shown by continuous lines in the drawing.

The inlet opening 50 of the separating valve 29 is connected via an S-shaped channel 102 to the channel 96. The outlet opening 52 is connected via an S-shaped channel 104 oriented in the opposite direction, to the channel 96, so that both connections of the separating unit 28 are coaxial. Where this does not play a role, the outlet opening 52 can also be in direct communication with the channel 96.

The separating valve illustrated in FIG. 7 operates broadly as follows:

In the conveying position paint conveyed by the metering pump 14 is conveyed through the separating valve 29 to the spray gun 10.

By appropriate actuation of the drive 100 the displacement rod 98 is moved into the channel 96 and displaces paint still present there into the intermediate reservoir 80.

The fit between the displacement rod 98 and the channel 96 is so good that the possibly remaining paint film between the mutually opposite surfaces of the displacement rod and channel is so thin that overall a very high resistance is obtained. By virtue of the fact that the effective axial extension of the displacement rod 98 is increased, the resistance of a possibly remaining paint film between the co-operating circumferential surfaces of the displacement rod and channel can be increased further if one does not wish to or cannot choose the fit between the displacement rod and channel to be even tighter.

As in the example of implementation according to FIG. 1, one can monitor by measuring the resistance whether the electrical insulation provided by the separating valve 29 and the separating unit 28 is sufficient, and the measurement result can also be used for the automatic application of the high voltage to a spray gun or to another consumer at the high voltage potential.

Figure 8:
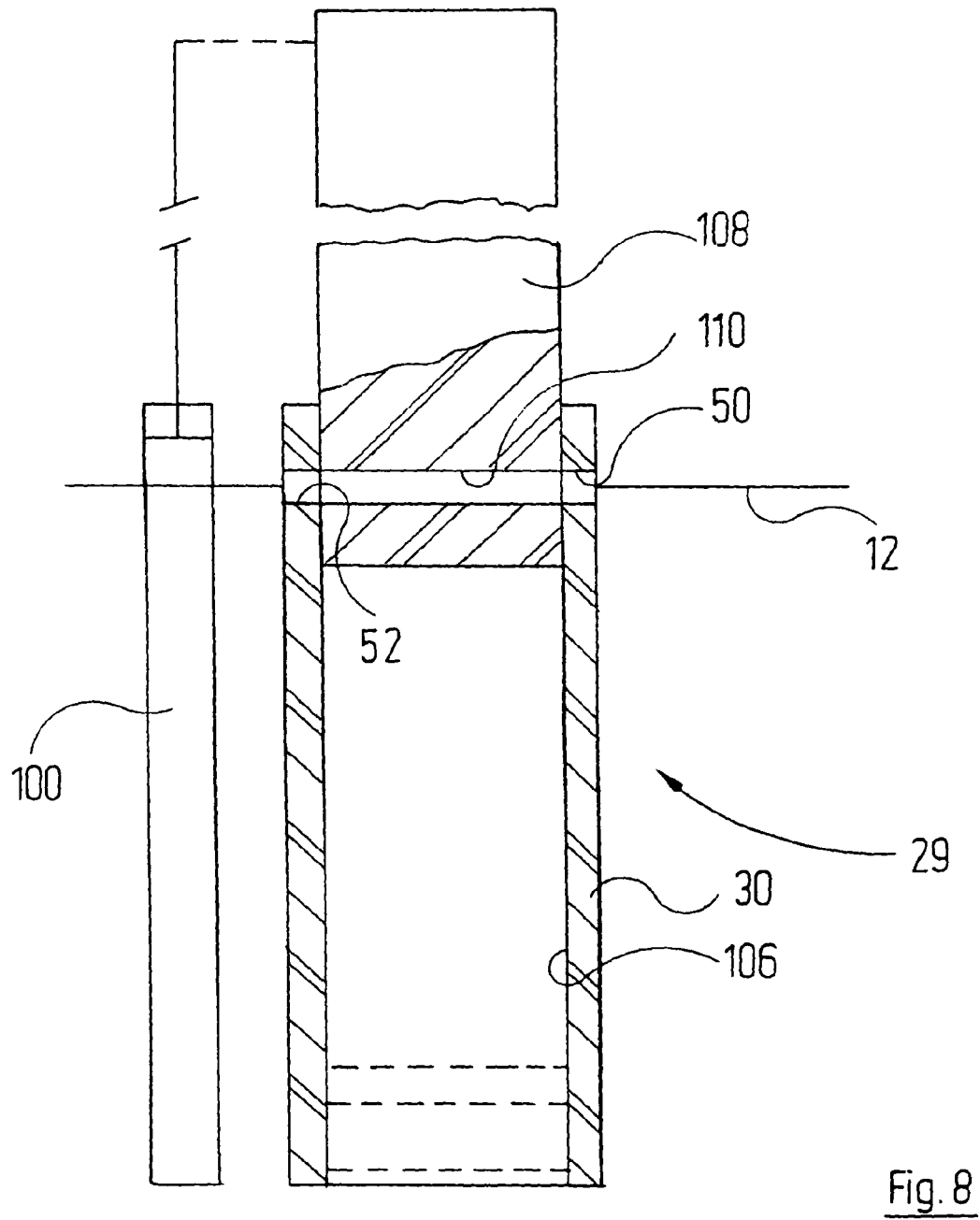
FIG. 8 is an axial section through a further modified separating valve.

Also with the separating valve according to FIG. 8 a housing 30 is provided that is fabricated from an electrically highly insulating material and is held by metallic end plates 54. In the housing 30 a chamber 106 is formed in which a slide valve 108 is arranged that is likewise fabricated from an electrically highly insulating material. In the slide valve 108 a bore 110 is formed that can be moved to a position flush with the inlet opening 50 and the outlet opening 52, in which position the separating unit provides a scrapeable smooth continuous throughflow opening. The slide valve 108 can be moved by means of a drive 100 from this conveying position in a direction transverse to the axis of the bore 110, as is shown diagrammatically in FIG. 8.

If the slide valve 108 is moved from the conveying position shown by continuous lines in FIG. 8 into an isolating position represented by dotted lines in FIG. 8, then the paint column contained in the bore 110 is also expelled electrically from the line 12. A small current could still flow only as a result of a thin paint film remaining on the co-operating surfaces of the slide valve 108 and housing 30. The contribution of the paint film can on the one hand be reduced by improving the fit between the slide valve and housing, and on the other hand can also be reduced by increasing the stroke of the slide valve movement.

Figure 9:
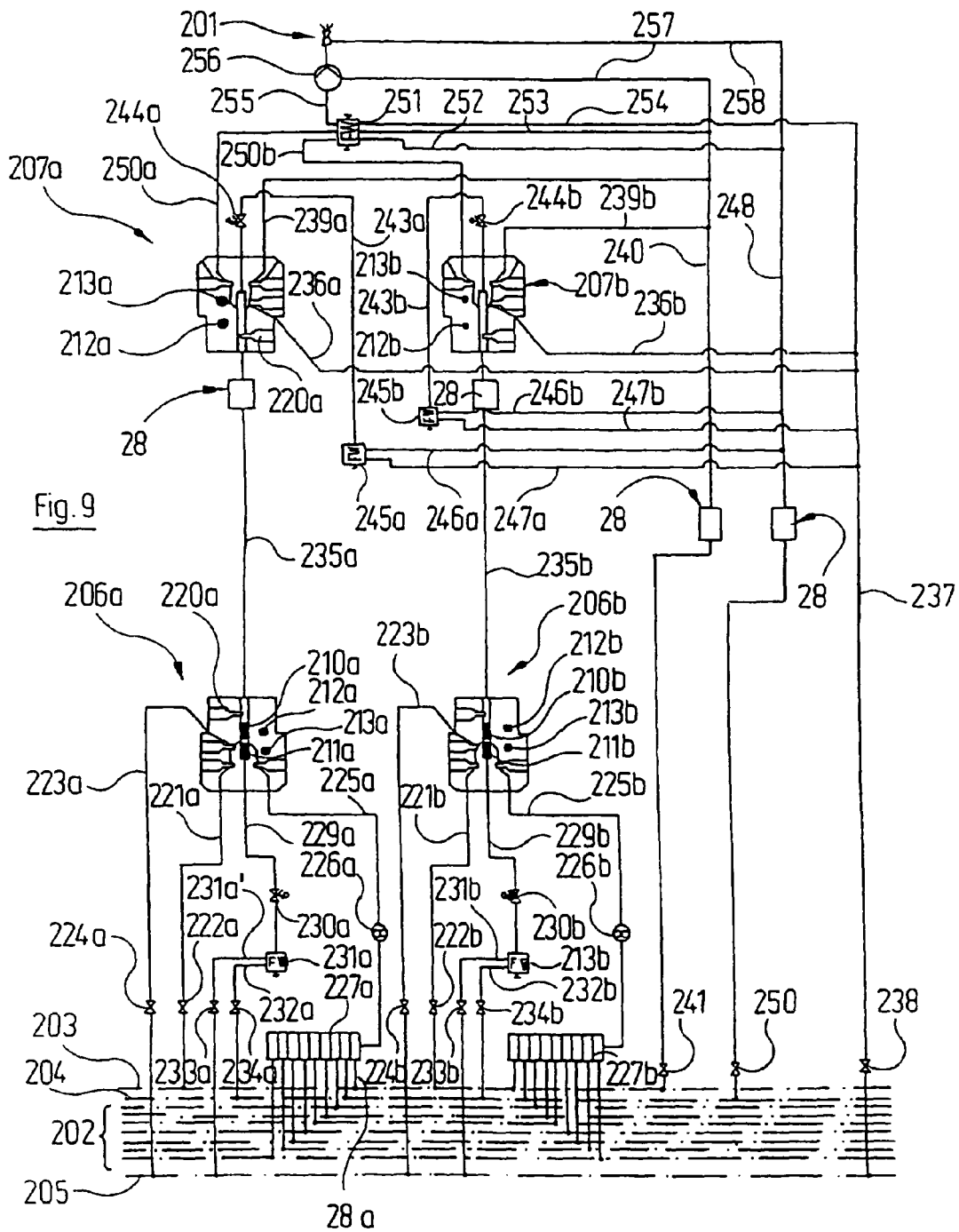
FIG. 9 is a diagrammatic representation of an electrostatic multiple-colour paint spraying unit, in which separating units are used as are shown in FIGS. 1 to 8.

FIG. 9 shows the fluidic part of a multicolour spray unit, in which the connection of an electrostatic spray gun 201 to a high voltage source has been omitted for the sake of clarity.

The paint supply system illustrated in FIG. 9 serves to supply an atomiser 201 illustrated at the upper edge of the figure and operating under an internal charge, as desired with one of the paints of different colours that circulate in the paint supply lines 202 shown in the lower edge of FIG. 9. In the illustrated system there are seven such paint supply lines 202, so that therefore seven paint colours can be used. A solvent feed line 203, a discharge line 204 as well as a compressed air line 205 also run in parallel to the paint supply lines 202.

The feed of paint from the paint supply lines 202 to the atomiser 201 takes place via two system branches arranged in parallel. The reference numerals of the components that belong to the left-hand system branch in FIG. 9 are identified by the letter "a", while the reference numerals of those components that belong to the system branch shown on the right-hand side of FIG. 9 are identified by the letter "b". Since both branches are configured identically, only the system branch shown on the left-hand side of FIG. 9 will be described in more detail hereinafter.

Figure 10:
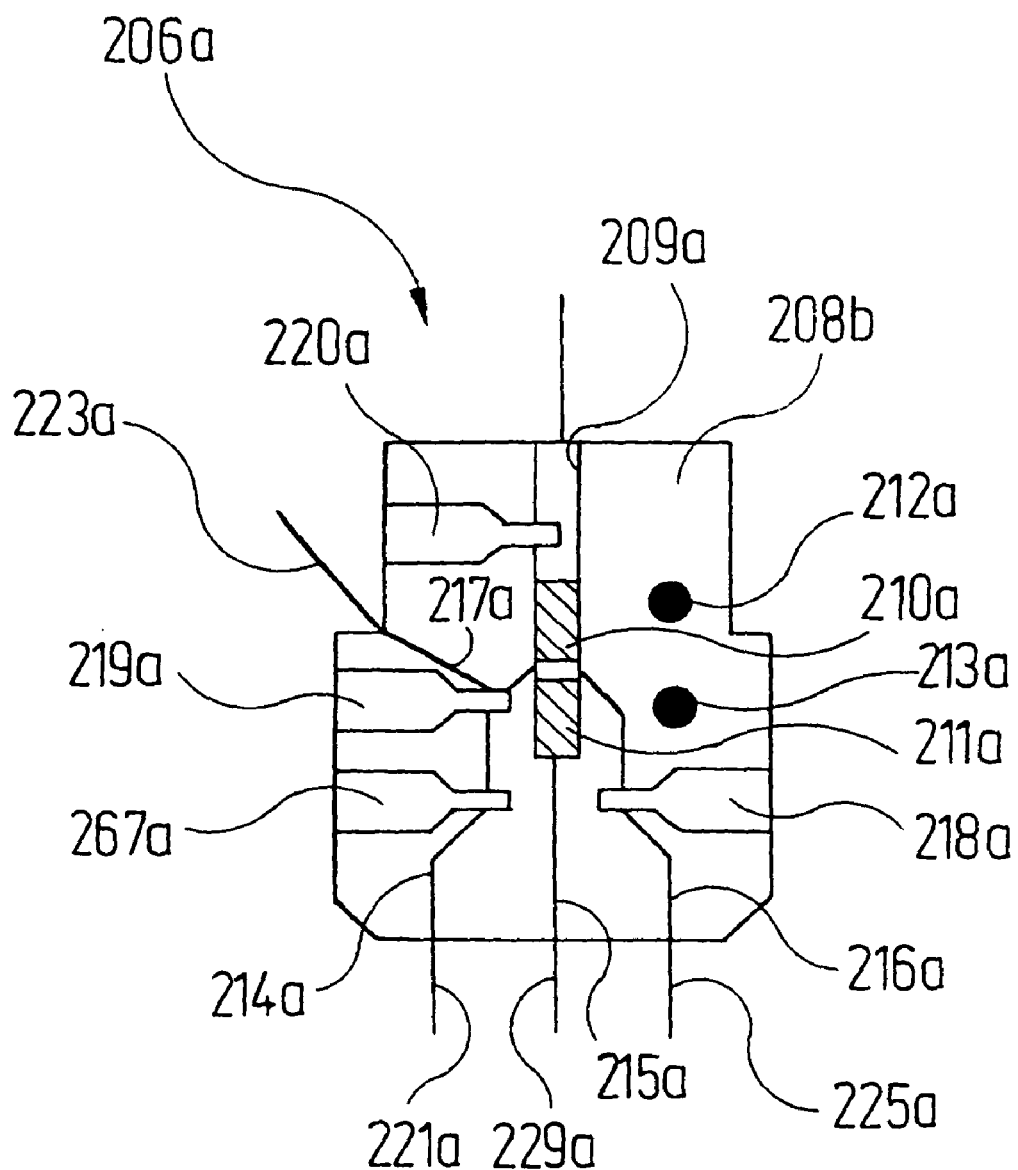
FIG. 10 is an axial section on an enlarged scale through a scraper station of the spraying unit illustrated in FIG. 9; and, FIG. 11 is a diagrammatic representation of the mechanical parts of a modified separating unit.

This system branch comprises, as most important components, a first scraper station 206a adjacent to the paint supply lines 202 as well as a second scraper station 207a adjacent to the atomiser 201. The construction of all scraper stations 206a, 206b, 207a, 207b in the paint supply system is identical, and accordingly it is sufficient to describe in more detail with the aid of FIG. 10 the structure of the scraper station 206a:

The scraper station 206a comprises a housing 208a in which a movement channel 209a is formed for two scrapers 210a, 211a arranged behind one another. The two scrapers 210a and 211a are shown in FIGS. 9 and 10 in their respective parking positions within the scraper station 206a.

A total of four channels 214a, 215a, 216a, 217a lead through the housing 208a to the movement channel 209a, via which channels different media can be introduced at different points of the movement channel 209a in a manner still to be described. The middle channel 215a shown in FIG. 10 leads to the end of the movement channel 209a, so that the medium fed to this point can strike the front face of the scraper 211a shown at the foot of FIGS. 9 and 10. The other channels 214a, 216a, 217a on the other hand terminate from opposite sides in the movement channel 209a at a point that is between the two scrapers 210a and 211a, so that from here the space lying between these two scrapers 210a and 211a can be reached.

A shut-off valve 267a, 218a, 219a is arranged in each case in each of these three channels 214a, 216a, 217a.

A stopper 220a can be driven under the action of compressed air into the movement channel 209a of the scrapers 210a, 211a. An expulsion of the scrapers 210a, 2111a from the scraper station 206a or an insertion of these scrapers 210a, 211a into the scraper station 206a is possible only when the stopper 220a is withdrawn. As shown in FIG. 9, the lower, left-hand channel 214a of the scraper station 206a is connected via a line 221a in which a shut-off valve 222a is arranged, to the solvent feed line 203. The channel 217 lying in the upper left-hand part of FIG. 9 is connected via a line 223a, in which a shut-off valve 224a is arranged, to the compressed air line 205. The channel 216a shown at the bottom right-hand part of FIG. 9 is connected via a line 225a in which a volumetric measuring unit 226a is arranged, to a paint changing unit 227a.

The paint changing unit 227a is in turn in communication via a total of nine stub lines 228a with the paint supply lines 202 as well as with the solvent feed line 203 and the discharge line 204. The paint changing unit 227a is able to form as desired a connection between the line 225a and one of the lines 202, 203, 204.

The channel 215a running in the middle, lower region of the housing 208a of the scraper station 206a shown in the drawing is finally connected via a line 229a, in which an adjustable flow control valve 230a is arranged, to a changeover valve 231a. The changeover valve 231a is able to connect, as desired, the line 229a to a first stub line 232a or to a second stub line 233a, or also to interrupt both connections. The left-hand stub line 231a shown in the drawing leads via a shut-off valve 233a to the compressed air supply line 205, while the right-hand stub line 232a shown in the drawing leads via a shut-off valve 234a to the discharge line 204.

The mouth of the movement channel 209a of the scraper station 206a is connected via a scraper line 235a, shown only diagrammatically in the drawing, to the mouth of the movement channel 209a of the scraper station 207a arranged in the opposite sense (opposite direction) adjacent to the atomiser 201. The scraper line 235a may be a flexible tube whose internal diameter is adapted in a known manner to the external diameter of the scrapers 210a, 211a so that the outer surfaces of the scrapers 210a, 211a rest in a fluid-tight manner against their inner surfaces when the scrapers move through the scraper line 325a.

The various channels 229a, 214a, 215a, 216a and 217a of the scraper station 207a adjacent to the atomiser are incorporated into the system in the following way:

The channel 217a is connected via a line 236a to a compressed air collection line 237, which in turn is connected via a shut-off valve 238 to the compressed air line 205.

The channel 214a of the scraper station 207a is connected via a line 239a to a solvent collection feed line 240a, which is in communication via a shut-off valve 241 with the solvent feed line 203. The solvent collection feed line 240 is interrupted at a point by a separating unit 28, as has been described above.

The channel 215a of the scraper station 207a adjacent to the atomiser is in turn connected via a line 243a, in which an adjustable flow control valve 244a is arranged, to a changeover valve 245a. The changeover valve 245a is able to connect, as desired, the line 243a to one of two lines 246a and 247a, or also to shut off the line 243a. The upper line 246a shown in the drawing leads to a discharge collection line 248, which in turn is connected via a separating unit 28 and a shut-off valve 250 to the discharge line 204.

The channel 216a of the scraper station 207a adjacent to the atomiser is finally connected via a line 250a to a further changeover valve 251, to which also leads the line 250b, corresponding to the line 250a, of the right-hand branch of the system shown in the drawing. In this way the two branches of the system are combined at the changeover valve 251. The changeover valve 251 is able to connect, as desired, each of the lines 250a, 250b to one of four lines 252, 253, 254, 255, or also to shut off the lines 250a, 250b.

The bottom-most line 252 shown in the drawing leads to the discharge collection line 248, the line 253 lying thereabove leads to the solvent collection feed line 240, the line 254 similarly lying thereabove leads to the compressed air collection line 237, and the line 255 extending substantially upwards from the changeover valve 251 leads to a metering pump 256, the outlet of which in turn is in communication with the atomiser 201. The metering pump 256 may also be supplied with solvent via a line 257 from the solvent collection feed line 40. Finally, the atomiser 201 is connected via a further line 258 to the discharge collection line 248.

In the following description of the mode of operation of the paint supply system the right-hand branch of the system shown in the drawing, which contains the components identified by the letter "b", is first of all disregarded. The way in which this branch of the system engages in the overall function is then discussed.

First of all the situation illustrated in the drawing will be taken as the starting point, in which the scrapers 210a 211a are located in the scraper station 206a adjacent to the paint supply lines 202. The presence of the scrapers there is verified by the detectors 212a, 213a. The stopper 220a is driven into the movement path of the scrapers 210a, 211a so that the latter cannot leave the scraper station 206a. It is also assumed that all components are cleaned, in a manner that is not of interest here, in order to remove paint residues originating from a previous painting operation. To carry out a new painting operation, a specific amount of the paint fed to the paint supply lines 202 should now be discharged from one of the said supply lines to the atomiser 201. To this end the following procedure is adopted:

First of all a connection is formed between the desired paint supply line 202 and the line 225a leading to the channel 216a of the scraper station 206a by opening the corresponding shut-off valve in the paint changing unit 227a. The stopper 220a is retracted so that it no longer blocks the exit of the upper scraper 210a from the scraper station 6a. By opening the valve 218a in the scraper station 206a paint can now enter the space between the two scrapers 210a and 211a and in this way expel the upper scraper 210a in the drawing from the scraper station 206a.

The scraper 210a at the same time displaces the air in front of it in the direction of movement in the scraper line 235a. This air is fed via the movement channel 209a of the scraper station 207a adjacent to the atomiser, its channel 215a and the line 243a as well as, with a corresponding setting of the changeover valve 245a, via the line 246a and the discharge line 248 when the shut-off valve 250 is open, to the discharge line 204. The flow control valve 244a, which as regards flow lies behind the scraper station 207a adjacent to the atomiser, is in this connection adjusted so as to achieve the desired speed of movement of the scraper 210a in the scraper line 235a.

The amount of paint that is discharged into the space between the moving scraper 210a and the scraper 211a that is still in its parking position in the scraper station 206a, is monitored by the volumetric measuring unit 226a. When the desired amount of paint is reached, the corresponding shut-off valve in the paint changing unit 227a as well as the shut-off valve 218a in the scraper station 206a are closed. The second scraper 211a is now connected at the lower front surface shown in the drawing, via the line 229a and the correspondingly adjusted changeover valve 231a, to the compressed air line 205 after the shut-off valve 233a was opened. The compressed air now also displaces the scraper 211a from the scraper station 206a and—via the paint enclosed between the two scrapers 210a and 211a—pushes forwards the scraper 210a that first left the scraper station 206a, and which up to this point had been displaced forwards by the paint.

A type of "packet" consisting of the two scrapers 210a and 211a and the volume of paint enclosed therebetween is now formed, which is moved forwards in the scraper line 235a by the compressed air fed through the line 229a. The flow control valve 230a in the line 229a is in this connection fully open.

After passing along the scraper line 235a the scraper 210a running in front first of all enters the scraper station 207a adjacent to the atomiser, the stopper 220a of which obviously has had to be withdrawn. The reaching of the end and parking position for the scraper 210a is recognised by the detector 213a of the scraper station 207a. The connection to the discharge line 248 is now interrupted in the changeover valve 245a. At the same time the line 250a is connected via the line 255 to the metering pump 256 by appropriately setting the changeover valve 251. When the second scraper 211a, displacing the volume of paint in front of it, now approaches the scraper 210a that has come to a stop in its parking position in the scraper station 207a, the volume of paint is displaced through the lines 250a and 255 to the metering pump 256. The workpiece, for example a car body part, can now be painted by appropriate actuation of the atomiser 201. The amount of paint required in each case is at the same time adjusted by the metering pump 256.

When the painting procedure is complete, the high voltage is removed from the atomiser 201. The atomiser 201, the metering pump 256 and the line 255 between the metering pump 56 and the changeover valve 251 is rinsed via the lines 253 and 257 at the appropriate setting of the changeover valve 251, as well as via the line 258 with the shut-off valves 241 and 250 open.

The paint residue still remaining between the scrapers 211a and 210a in the scraper station 207a is discharged by setting the changeover valve 251 so that the line 250a is now connected to the line 252 and thus to the discharge line 204.

When the detector 212a of the scraper station 207a adjacent to the atomiser establishes that the second scraper 211a too has reached its parking position within the scraper station 207a, the stopper 220a of the scraper station 207a is expelled, whereby both scrapers 210a, 211a are held in the scraper station 207a adjacent to the atomiser.

The paint in the line 250a that connects the scraper station 207a to the changeover valve 251 is then discharged in the following way: the valves 267a and 218a of the scraper station 207a are opened and the changeover valve 251 is actuated so that a connection is formed between the line 250a and the discharge collection line 248. In this way solvent can flow through the space lying between the two scrapers 210a, 211a and the line 250a and can clean the corresponding pathways. By alternately opening the valves 219a and 267a the flow can take place alternately in pulsed manner with compressed air and with solvent. This cleaning procedure is completed by forcing out with compressed air any solvent contained between the scraper station 207a and the changeover valve 251.

The return transportation of the two scrapers 210a, 211a from the scraper station 207a adjacent to the atomiser to the scraper station 206a adjacent to the paint supply lines 202 can now be started. At the same time a cleaning of the connection pathway between the two scraper stations 207a, 206a, in particular a cleaning of the scraper line 235a, takes place. In this connection a "packet" is re-formed, consisting of the two scrapers 210a and 211a and a fluid volume enclosed by these scrapers. However, this liquid is now a cleaning solvent. The procedures in detail are as follows:

First of all the stopper 220a of the scraper station 207a is driven back so that the pathway for the scrapers 210a, 211a is free. The flow control valve 230a, which lies in the flow direction behind the scraper station 206a, is now adjusted so that a certain resistance to the air to be displaced and that is contained in the scraper line 235a is generated, whereby the movement speed of the scrapers 210a, 211a and of the solvent volume enclosed between these is determined.

First of all by opening the valve 267a of the scraper station 207a with the shut-off valve 241 open, solvent is brought into the intermediate space between the two scrapers 210a and 211a via the solvent collection feed line 240 and the line 239a. The scraper 211a running ahead in this case is thereby forced out from the scraper station 207a.

At a certain distance from the scraper station 207a a further detector 260a is installed in the vicinity of the scraper line 235a, which detector responds when the two scrapers 210a, 211a pass it. If the detector 260a establishes that the scraper 211a running in front has passed the corresponding point in the scraper line 235a, the valve 267a is closed and the further feed of solvent into the intermediate space between the two scrapers 210a, 210b is interrupted.

Compressed air is now directed via the changeover valve 245a with the flow control valve 244a substantially open, through the compressed air collection line 237 and the lines 247a as well as 243a, onto the upper (in the drawing) front side of the scraper 210a that is still present in the scraper station 207a. This compressed air now forces the whole "packet" consisting of the two scrapers 210a, 210b and the enclosed volume of solvent through the scraper line 235a. Once the scraper 210a running behind has passed the detector 260a, a sufficient isolating stretch of pathway between the "packet" and the scraper station 207a now exists, so that the high voltage can be applied once more to the atomiser 201.

The scraper 211a running ahead in this cleaning procedure finally runs into the scraper station 206a adjacent to the supply lines 202. If the detector 213a of the scraper station 206a establishes that the scraper 211a has again reached its parking position illustrated in the drawing, the connection between the line 229a and the discharge line 204 in the changeover valve 231a is interrupted. Instead, the valve 218a of the scraper station 206a and the corresponding valve within the paint changing unit 227a are opened so that the volume of solvent enclosed between the two scrapers 210a, 211a can be forced through the line 225a and through the paint changing unit 227a into the discharge line 204. At the same time the connection line 225a and the volumetric measuring unit 226a arranged in this line are simultaneously cleaned with removal of paint.

If the detector 212a of the scraper station 206a establishes that also the scraper 210a running behind has run into its parking position in the scraper station 206a, the stopper 220a of the scraper station 206a is driven in so that both scrapers 210a, 211a are held in the scraper station 206a. The rinsing procedure can be continued by opening the shut-off valve 222a in the line 21a as well as the valve 267a in the scraper station 206a. Cleaning can in this connection be renewed by alternately opening the valves 267a and 219a of the scraper station 206a in a pulsed manner, alternating with compressed air and with solvent. The last rinsing procedure should be carried out again with compressed air.

The valves 218a of the scraper station 206a and the shut-off valve of the paint changing unit 227a leading to the discharge line 204 are now closed. The left-hand branch of the system in the drawing is now completely clean and is ready for a new painting procedure with paint of the same or another colour.

In principle the paint supply system may be operated in the manner described above with a single branch of the system. Undesired interruptions in the painting procedure occur however on account of the return transportation of the two scrapers 210a, 211a from the scraper station 207a adjacent to the atomiser to the scraper station 206a adjacent to the paint supply lines 202 and on account of the associated cleaning procedure. For this reason the second branch of the system is provided in the example of implementation illustrated in the drawing which, as already mentioned, is designed identically to the first branch of the system. The two branches of the system are driven in the manner of a "push-pull" arrangement, so that one branch is always in the mode in which paint is transported in the direction to the atomiser 201, while the other branch is in the cleaning mode, in which the corresponding scraper line 235a or 235b and the other components of this branch of the system are freed from the paint residues.

If there is no change of paint colour between two consecutive painting procedures, then the procedures outlined above may proceed in a similar way, although cleaning procedures may be omitted.

A separating unit 28 is inserted in each case into the lines 235a, 235b, 237, 240 and 248 that extend from the spray gun-side part of the plant under high voltage to the supply-side part of the plant, as has been explained above with reference to FIGS. 1 to 8. This insertion preferably takes place in the vicinity of the plant parts to be subjected to high voltage, at substantially equivalent points in the line, in order to keep the plant parts that are under high voltage small and at the same time to ensure that adjacent plant parts are as far as possible at the same potential.

Figure 7:
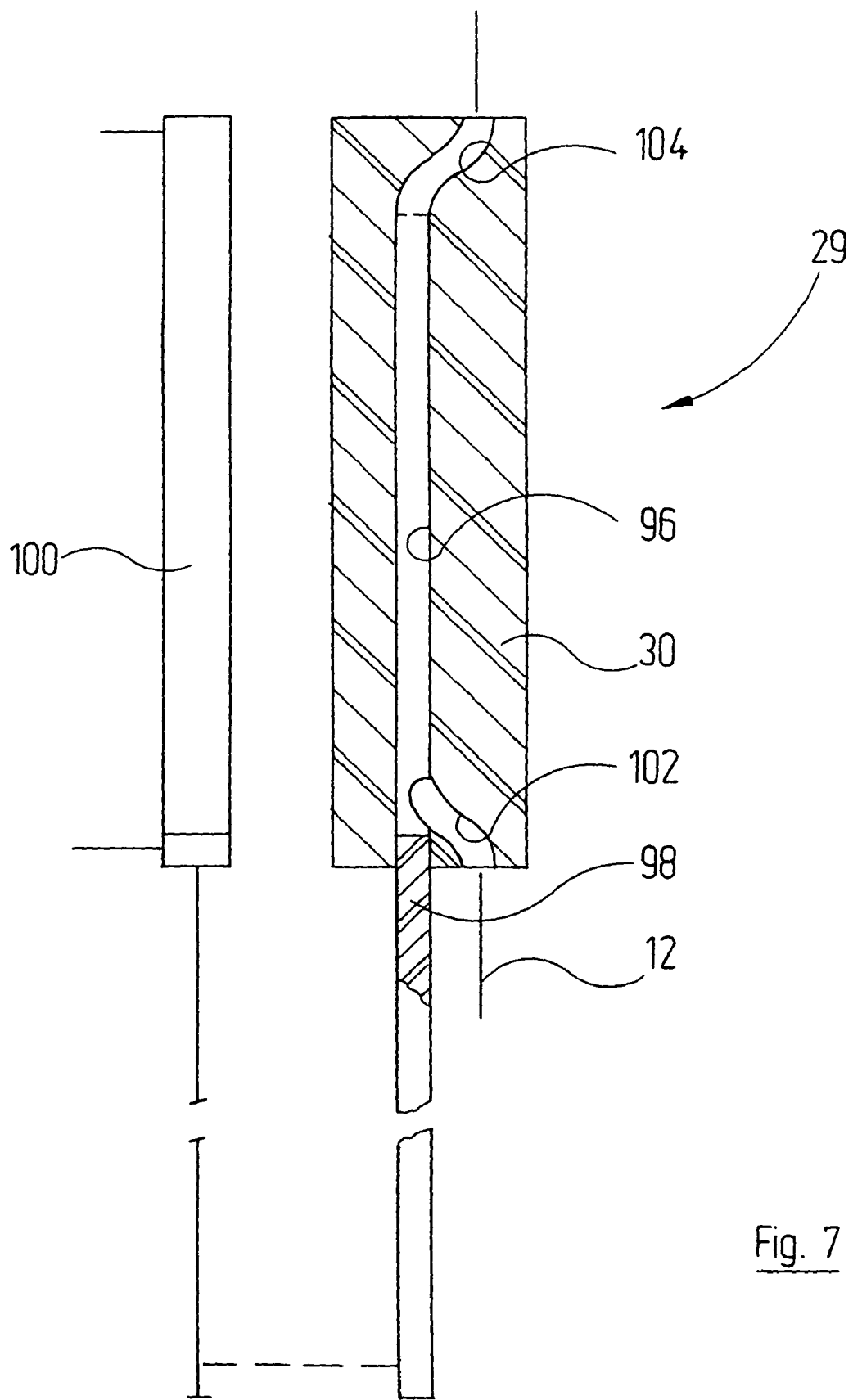
FIG. 7 is an axial section through a further modified separating valve.
Figure 11:
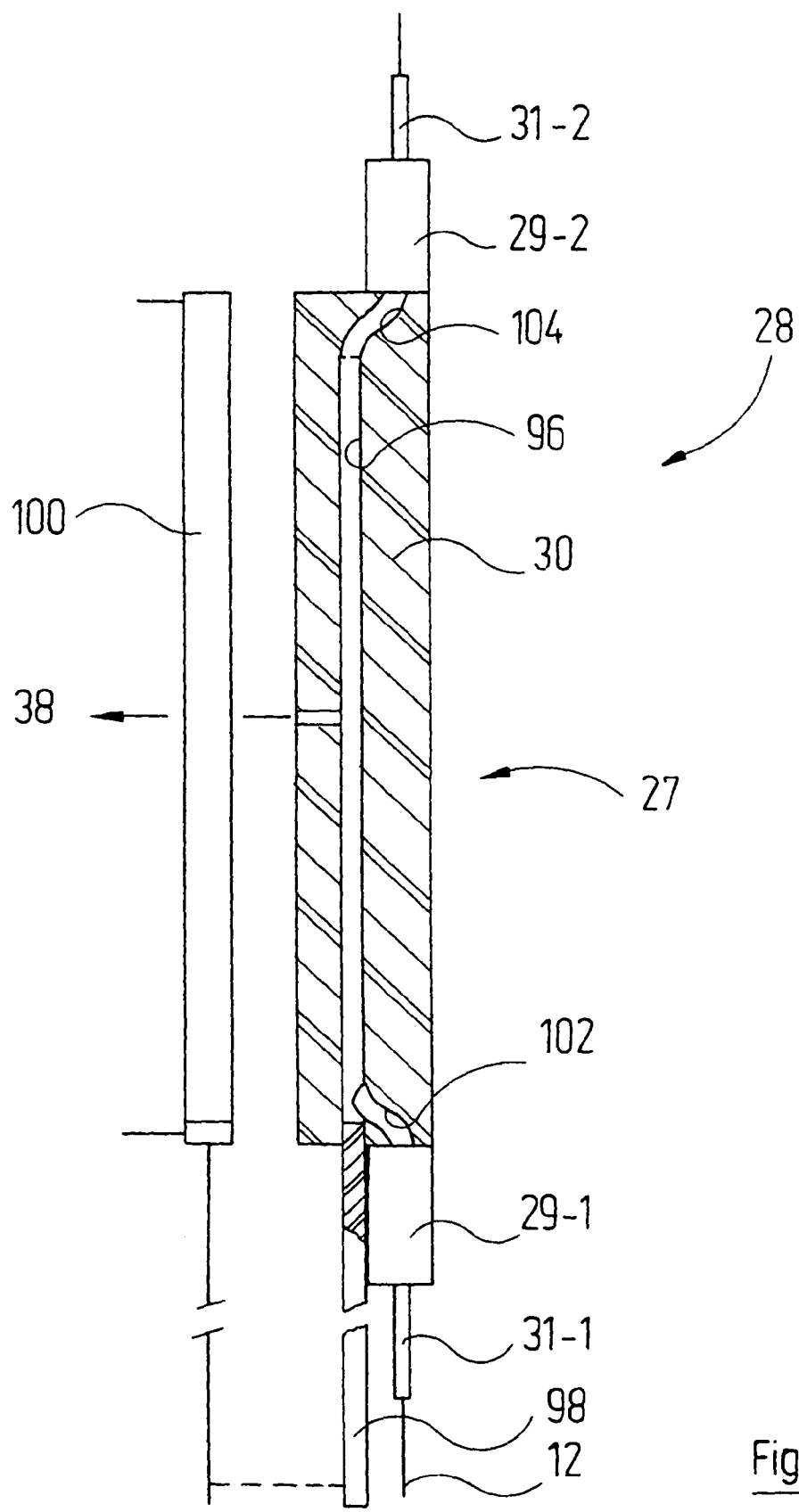

The separating unit shown in FIG. 11 has a separating pipe 27 whose structure substantially corresponds to that of a separating valve 29 according to FIG. 7. Separating valves 29-1 and 29-2 are then again mounted on the two ends of the separating pipe 27, as has been explained above with reference to FIGS. 1 to 8. It is understood that a separating pipe 27 can also be realised on the basis of the other separating valves described in FIGS. 1 to 6 and 8, to which is given a corresponding length in the conveying direction.

The separating units 28 may additionally also take over the function of relay valves, if lines are cleaned with solvent and/or compressed air during the cleaning of the plant.

From the above description of the separating valves of the separating units it is clear that these provide in the conveying position a free passage for the conveyed medium. They furthermore have only very small clearance spaces (dead spaces). There is no significant pressure loss in the conveying position. They can also be realised in a fluid-tight and leak-free manner using simple means. In addition they are very easy to handle.

Suitable materials for insulating elastomeric displacement bodies are in particular chloroprene polymers such as Neoprene, EPDM (ethylene/propylene terpolymer), fluoroelastomers such as Viton, PTFE (polytetrafluoroethylene) and chlorobutyl polymers.

Apart from their deformability and good electrical insulation properties, these materials also have the advantage that they are as a rule highly abrasion resistant, which means that the separating units have a high service life even when conveying abrasive media such as paints.

Suitable materials for the insulating separating pipe and the insulating housing of the separating valves are in particular:

polytetrafluoroethylene, polyamide, polyethylene, polyoxymethylene, polyvinylidene fluoride, polypropylene, and especially PP ST1000.

In the case of those examples of implementation described above that comprise deformable displacement bodies, these were tightly connected to the housing of the separating valve using clamping pieces. As a modification or in addition the end sections of the displacement bodies may also be vulcanised directly onto a housing section of the housing of the separating valve.

As a modification of the examples of implementation described above, the separating valve 29-1 may be omitted if the paint pump 14 is a gear pump. Such a pump forms a pressure-resistant seal, spaced from the separating unit 28, for that part of the line 12 lying in front of the separating unit 28, against which the liquid column remaining between the separating unit and pump can rest when the interior of the separating pipe is subjected to pressure. Also, under these circumstances the build-up of a high pressure in the separating pipe that is desired in order to raise the breakdown strength is possible.

If the paint is stored behind the separating unit 28 in a closed reservoir 80, then the consumer-side part of the line 12 can be closed by means of a metering valve that is part of the spray gun 10. The separating valve 29-2 can then also be omitted. In this case the paint can then be forced out from the reservoir 80 by means of an incompressible pressure medium using a liquid pump 81, which is separated from the paint volume by means of a membrane and is replenished at exactly the same rate as paint is consumed.

What is claimed is:

1. A spray gun assembly comprising:
a spray gun communicating with a storage vessel through a fluid conveying line; and,
an electrical separating unit in the fluid conveying line, the electrical separating unit having a first connection part and a second connection part as well as a separating pipe extending there between that is fabricated from an electrically insulating material and can be charged with an electrically insulating separating fluid, wherein the separating pipe can be connected to a pressure adjustment device by means of which the separating pipe can as desired be deaerated or charged with separating fluid or evacuated, and wherein the separating pipe has two ends and includes a separating valve at each of the two ends that releases or seals a passage for the fluid to be conveyed;
wherein the separating unit is adapted to be a passage for a scraper.

2. The spray gun assembly of claim 1, wherein the separating fluid is a gas.

3. The spray gun assembly of claim 2, wherein the separating fluid is air.

4. The spray gun assembly of claim 2, wherein the separating fluid is provided by a compressor under a pressure of at least $10^2$ Pa, preferably about $10^6$ Pa.

5. The spray gun assembly of claim 2, wherein the separating fluid from a suction device is adjusted to a pressure of at most 1 Pa, preferably about $10^{-2}$ Pa.

6. The spray gun assembly of claim 1, wherein the valves and/or the separating pipe comprise a housing in which a fluid channel communicating with an inlet and an outlet is formed, and by means for displacing fluid from the fluid channel.

7. The spray gun assembly of claim 6, wherein the displacement means comprise a deformable displacement body that can be subjected to pressure.

8. The spray gun assembly of claim 7, wherein the displacement body is hollow and is substantially cylindrical or of truncated conical shape.

9. The spray gun assembly of claim 8, wherein the displacement body is provided at its ends with mounting flanges that are clamped between a front side of the housing and in each case a clamping plate.

10. The spray gun assembly of claim 7, wherein a supporting body that supports the displacement body in an unloaded state is permeable to a working fluid by means of which pressure can be exerted on the displacement body.

11. The spray gun assembly of claim 10, wherein the radius of the supporting body is greater, by the wall thickness of the displacement body, than the radius of the inlet and outlet of the housing.

12. The spray gun assembly of claim 11, wherein the clamping plates have a shaped rib that in profile matches a rounded section of an oppositely-facing end of the housing.

13. The spray gun assembly of claim 7, wherein the displacement body has a line of weakness.

14. The spray gun assembly of claim 7, wherein the displacement body is elongated and from one end to its other end increases in diameter and/or in wall thickness.

15. The spray gun assembly of claim 7, wherein the displacement body is closed on all sides and is connected securely via a part of its circumferential surface to the wall of the fluid channel of the housing.

16. The spray gun assembly of claim 6, wherein the displacement body is formed as a rod fabricated from electrically insulating material, which rod can be tightly displaced in a channel that forms a part of the fluid channel of the housing.

17. The spray gun assembly of claim 16, wherein the channel is connected via S-shaped channel sections to the inlet and outlet of the housing.

18. The spray gun assembly of claim 6, wherein the displacement means is formed as a slide valve including electrically insulating material, which has a bore that can move between a conveying position communicating with the inlet and outlet of the housing and a separating position spatially remote from the conveying position.

19. The spray gun assembly of claim 6, characterised in that it is provided with two spaced-apart electrical control contacts, preferably in each case adjacent to one of the connection parts or formed by the latter.

20. The spray gun assembly of claim 19, wherein a resistance measuring device is connected to the control contacts.

21. The spray gun assembly of claim 20, wherein the resistance measuring device is formed as a threshold value switch and its output signal is passed to a control terminal of a high voltage generator.

22. The spray gun assembly of claim 1, wherein a fluid storage device is connected to the conveying line behind the first or second connection part.

23. The spray gun assembly of claim 1, wherein the separating pipe and the separating valves have the same internal diameter.

24. The spray gun assembly of claim 1, wherein the separating pipe is produced from an electrically insulating plastic material selected from the group consisting of polytetrafluoro-ethylene, polyamide, polyethylene, polyoxy-methylene, polyvinylidene fluoride, polypropylene, and PP ST 1000.

25. The spray gun assembly of claim 24, wherein the electrically insulating plastic material is reinforced with fibres.

26. The spray gun assembly of claim 1, wherein a pressure sensor is connected to the separating pipe.

27. A spray gun assembly comprising:
a spray gun communicating with a storage vessel through a fluid conveying line; and,
an electrical separating unit in the fluid conveying line, the electrical separating unit having a first connection part and a second connection part as well as a separating pipe extending there between that is fabricated from an electrically insulating material and can be charged with an electrically insulating separating fluid, wherein the separating pipe can be connected to a pressure adjustment device by means of which the separating pipe can as desired be deaerated or charged with separating fluid or evacuated, and wherein separating pipe has two ends and includes a separating valve at each of the two ends that releases or seals a passage for the fluid to be conveyed;
clamping plates, made of electrically conducting material, are secured to each front face of a housing of the separating valve, which clamping plates form electrodes to measure the electrical resistance of the separate valve.

* * * * *